US011872620B2

(12) United States Patent
Yanagawa et al.

(10) Patent No.: US 11,872,620 B2
(45) Date of Patent: Jan. 16, 2024

(54) PRESS BRAKE AND MANAGEMENT SYSTEM

(71) Applicant: AMADA CO., LTD., Kanagawa (JP)

(72) Inventors: Koichi Yanagawa, Kanagawa (JP); Tetsuaki Kato, Kanagawa (JP); Hidehiko Yoshida, Kanagawa (JP)

(73) Assignee: Amada Co., Ltd., Kanagawa (JP)

( * ) Notice: Subject to any disclaimer, the term of this patent is extended or adjusted under 35 U.S.C. 154(b) by 218 days.

(21) Appl. No.: 17/275,467

(22) PCT Filed: Aug. 22, 2019

(86) PCT No.: PCT/JP2019/032859
§ 371 (c)(1),
(2) Date: Mar. 11, 2021

(87) PCT Pub. No.: WO2020/059411
PCT Pub. Date: Mar. 26, 2020

(65) Prior Publication Data
US 2022/0048086 A1 Feb. 17, 2022

(30) Foreign Application Priority Data
Sep. 19, 2018 (JP) ................................ 2018-174789

(51) Int. Cl.
*B21D 5/02* (2006.01)
*B21D 5/00* (2006.01)
(Continued)

(52) U.S. Cl.
CPC ............... *B21D 5/02* (2013.01); *B21D 5/004* (2013.01); *B21D 55/00* (2013.01);
(Continued)

(58) Field of Classification Search
CPC ..... B30B 15/0052; B30B 15/10; B30B 15/16; B30B 15/161; B30B 15/165; B30B 15/26; B30B 15/28; B30B 5/02
See application file for complete search history.

(56) References Cited

U.S. PATENT DOCUMENTS 4,698,991 A * 10/1987 Kirii ..................... B30B 15/284
700/165
4,930,401 A 6/1990 Cameron et al.
(Continued)

FOREIGN PATENT DOCUMENTS

CN 1042221 A 5/1990
CN 104280243 A 1/2015
(Continued)

OTHER PUBLICATIONS

International Search Report for corresponding Application No. PCT/JP2019/032859, filed Aug. 22, 2019.
(Continued)

*Primary Examiner* — Debra M Sullivan
*Assistant Examiner* — Matthew Stephens
(74) *Attorney, Agent, or Firm* — Renner, Otto, Boisselle & Sklar, LLP

(57) ABSTRACT

A press brake is provided with a hydraulic cylinder configured to move an upper table and a lower table relative to each other in a vertical direction, and a control unit configured to control a hydraulic circuit of the hydraulic cylinder, in which the control unit manages a predictor of an occurrence of an abnormality in the hydraulic circuit including a first pressure control valve configured to control a back pressure of hydraulic oil on a first port side of the hydraulic cylinder.

6 Claims, 7 Drawing Sheets

(51) Int. Cl.

| | |
|---|---|
| ***B21D 55/00*** | (2006.01) |
| ***B30B 15/00*** | (2006.01) |
| ***B30B 15/16*** | (2006.01) |
| ***B30B 15/26*** | (2006.01) |
| ***B30B 15/28*** | (2006.01) |

(52) U.S. Cl.

CPC ........ *B30B 15/0052* (2013.01); *B30B 15/166* (2013.01); *B30B 15/26* (2013.01); *B30B 15/28* (2013.01)

(56) References Cited

U.S. PATENT DOCUMENTS

| | | | | |
|---|---|---|---|---|
| 6,959,581 | B2 | 11/2005 | Kanno | |
| 2003/0159599 | A1 * | 8/2003 | Ariji | B30B 15/18 100/269.1 |
| 2015/0007713 | A1 * | 1/2015 | Aki | G01M 13/00 91/1 |
| 2016/0084271 | A1 * | 3/2016 | Gomm | F15B 20/008 60/466 |
| 2018/0141299 | A1 * | 5/2018 | Kurokawa | B30B 15/28 700/165 |

FOREIGN PATENT DOCUMENTS

| | | | | | |
|---|---|---|---|---|---|
| EP | 1279488 | A1 | | 1/2003 | |
| JP | 62-220701 | A1 | | 9/1987 | |
| JP | H10-193200 | A | | 7/1998 | |
| JP | 2001-121299 | A | | 5/2001 | |
| JP | 2001-277000 | A | | 10/2001 | |
| JP | 2001277000 | A | * | 10/2001 | B30B 15/161 |
| JP | 2015-14990 | A | | 1/2015 | |
| JP | 2015-121898 | A | | 7/2015 | |
| JP | 2016-31086 | A | | 3/2016 | |
| JP | 2017-24027 | A | | 2/2017 | |
| WO | WO-2017186712 | A1 | * | 11/2017 | B30B 15/16 |

OTHER PUBLICATIONS

Office Action dated Nov. 19, 2019 in corresponding Japanese patent application 2018-174789, and its machine translation.

Office Action dated Jan. 28, 2020 in corresponding Japanese patent application 2018-174789, and its machine translation.

Extended European Search Report for corresponding European Application No. 19863820.7, dated Oct. 20, 2021.

* cited by examiner

PRESS BRAKE AND MANAGEMENT SYSTEM

TECHNICAL FIELD

The present invention relates to a press brake and a management system.

BACKGROUND ART

The press brake is a machine tool that moves an upper table and a lower table relative to each other in a vertical direction, and a pair of left and right hydraulic cylinders is typically used for the vertical movement (for example, see Patent Literature 1). Then, these hydraulic cylinders are controlled by hydraulic circuits each configured with a fluid pump and various valves. Therefore, if pollution (hereinafter referred to as "contamination") is mixed in the hydraulic circuit, the contamination may be caught in a valve, resulting in a malfunction of the hydraulic cylinder.

When an abnormality occurs in the hydraulic circuit as described above, the press brake first notifies an operator or the like of the abnormality by a warning such as an alarm, and also stops operation. Subsequently, the operator suspends the work and notifies a manufacturer of the press brake that there is an abnormality. Finally, the manufacturer who has received the notification from the operator dispatches a maintenance contractor such as service staff to the site to perform a necessary inspection and the like for the press brake. Then, according to the results of the inspection and the like, maintenance procedures such as replacement of parts are conducted, and the press brake is restored. The above is the general flow of the press brake from the occurrence of an abnormality to the restoration.

CITATION LIST

Patent Literature

Patent Literature 1: Japanese Patent Laid-Open No. 2001-121299

SUMMARY

Technical Problem

However, according to the above flow, operation of the press brake is stopped for a long time, which naturally decreases the productivity. Particularly, in a case in which parts need to be replaced, problems arise such as a prolonged downtime caused by the delivery date of the replacement parts and an incurred cost associated with the replacement parts. In addition, if the quality and quantity of the maintenance contractor are insufficient, this also leads to a prolonged restoration process. Therefore, in consideration of response to these problems, if it is possible to detect a predictor of an occurrence of an abnormality such as mixing of contamination, more appropriate measures can be taken in advance.

Therefore, an object of the present invention is to provide a press brake and a management system that manage a predictor of an occurrence of an abnormality such as mixing of contamination in a hydraulic circuit.

Solution to Problem

A press brake according to an embodiment of the present invention is provided with a hydraulic cylinder configured to move an upper table and a lower table relative to each other in a vertical direction, and a control unit configured to control a hydraulic circuit of the hydraulic cylinder, in which the control unit manages a predictor of an occurrence of an abnormality in the hydraulic circuit including a first pressure control valve configured to control a back pressure of hydraulic oil on a first port side of the hydraulic cylinder.

In addition, a management system is provided with a press brake including a hydraulic cylinder and a hydraulic circuit for moving an upper table and a lower table relative to each other in a vertical direction, and a management server device connected to the press brake in a data-communicable manner, in which either one of the press brake and the management server device is configured to be able to manage a predictor of an occurrence of an abnormality in the hydraulic circuit including a first pressure control valve configured to control a back pressure of hydraulic oil on a first port side of the hydraulic cylinder.

Advantageous Effect of Invention

According to the present invention, it is possible to provide a press brake and a management system that manage a predictor of an occurrence of an abnormality such as mixing of contamination in a hydraulic circuit.

DESCRIPTION OF EMBODIMENTS

Hereinafter, press brakes and management systems according to embodiments of the present invention will be described in detail with reference to the accompanying drawings. However, the following embodiments do not limit the invention according to each claim, and all the combinations of the features described in the embodiments are not necessarily essential to the solution of the invention.

[Overall Configuration of Management System]

First, the overall configuration of a management system 190 according to an embodiment of the present invention will be described with reference to FIG. 1. Note that in each drawing including FIG. 1, the scale and the size of each component may be exaggerated, or some components may be omitted.

Figure 1:
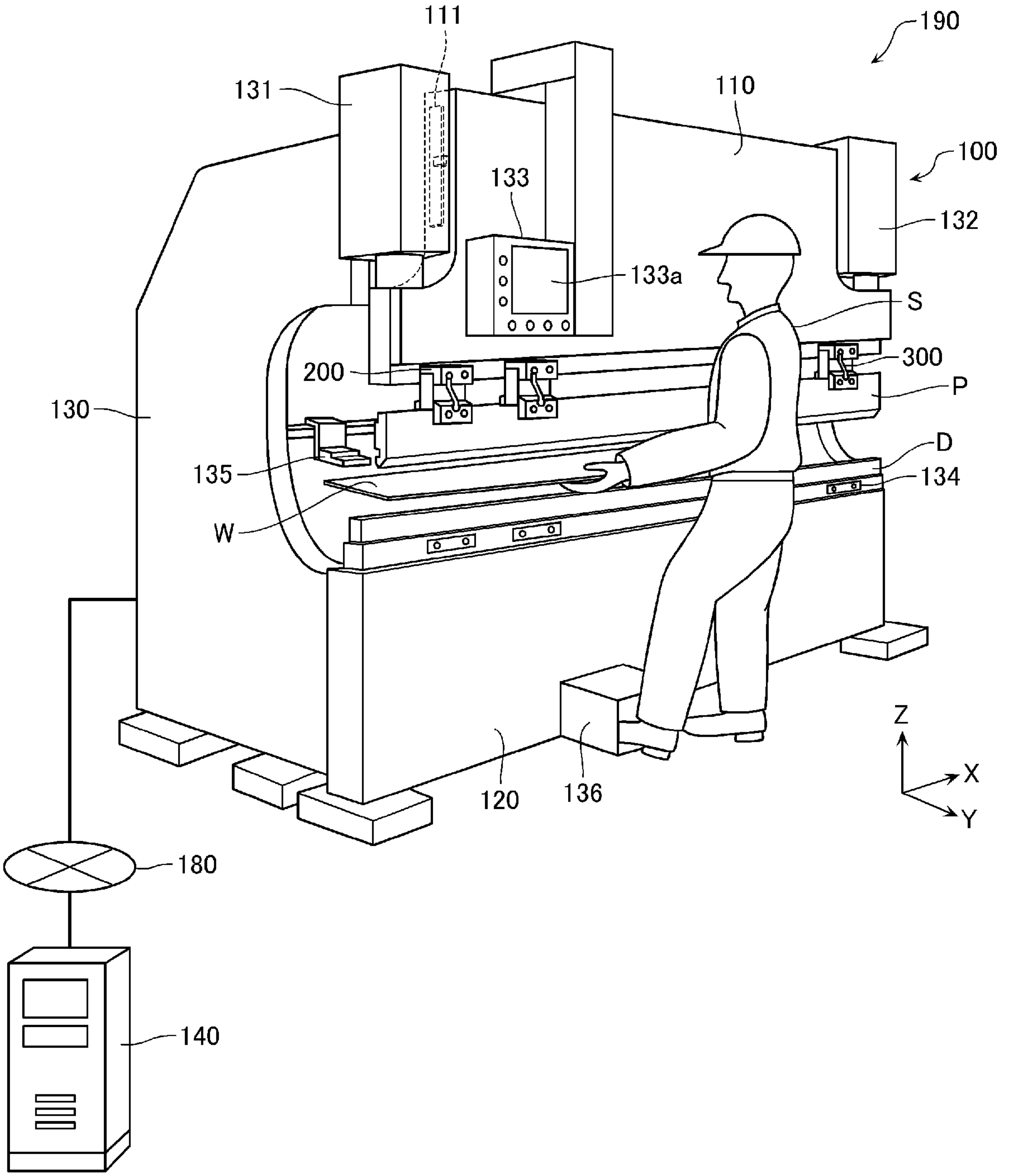
FIG. 1 is a diagram schematically showing an overall configuration of a management system according to an embodiment of the present invention.

As shown in FIG. 1, the management system 190 is provided with a press brake 100 configured to perform bending and the like of a plate material to be processed (workpiece W), and a management server device 140 configured to manage information on the press brake 100. The press brake 100 and the management server device 140 of the management system 190 are connected to each other via a communication network 180 such as the Internet in a data-communicable manner.

The communication network 180 includes, for example, a line that can be securely connected, such as a mobile phone network, a public line network, a LAN, a WAN, and a VPN (Virtual Private Network). In addition to the press brake 100 and the management server device 140, a terminal device (not shown) such as a tablet computer for operating and controlling the press brake may be connected to the communication network 180. In addition, "be connected" does not necessarily mean being physically connected by wiring or the like, but means that data and a signal can be transmitted and received between the respective components such as the press brake 100 and the management server device 140 regardless of being wired or wireless.

The press brake 100 of the management system 190 has side plates 130 on both sides of the machine main body. Hydraulic cylinders 131, 132 serving as ram drive sources are provided at the upper parts of the side plates 130, and the upper table 110 is attached via the hydraulic cylinders 131, 132. A punch holder 300 is attached to the upper table 110 by a clamp jaw 200. A punch P, which is an upper tool, is mounted in the punch holder 300.

The upper table 110 is provided with, for example, a control unit 145 (see FIG. 2) configured to control the entire press brake 100, and an operation panel 133 of the control unit 145 in a movable manner. The control unit 145 can not only control the operation of the hydraulic cylinders 131, 132 but also manage a predictor of an occurrence of an abnormality in the hydraulic circuit 150 of each of the hydraulic cylinders 131, 132 (see FIG. 2).

A display screen 133*a* of the operation panel 133 displays, for example, an order of bending of the workpiece W that is calculated by an automatic programming device, and various information on a tool consisting of the punch P and a die D to be used according to this order of bending. A lower table 120 is disposed at the lower parts of the side plates 130, and the die D, which is a lower tool, is mounted on the lower table 120 via a die holder 134.

Note that the press brake 100 according to the present embodiment is a descending press brake that moves the upper table 110 in a vertical direction with respect to the lower table 120 that is fixed. For this reason, for example, a linear scale 111 is connected to the upper table 110 as a position detector configured to detect position information of the upper table 110 in a moving direction (vertical direction).

The press brake 100 shown in FIG. 1 is configured, for example, such that the operation of a foot pedal 136 by an operator S causes the upper table 110 to move in a vertical direction relative to the lower table 120. Specifically, the operator S first presses the workpiece W against a butting body 135 of a back gauge arranged behind the lower table 120 for positioning. Subsequently, when the foot pedal 136 is depressed, the above-described hydraulic cylinders 131, 132 start to operate and lower the upper table 110. Then, the workpiece W is bent in cooperation of the punch P and the die D.

The management server device 140 of the management system 190 is, for example, a server device managed by the manufacturer of the press brake, which is configured to be able to monitor an operation status and the like of the press brake 100 in real time. In addition, the management server device 140 can perform predictor management of the press brake 100 by not only calculating and storing control-related information including various operation information of the press brake 100 by itself, but also obtaining these pieces of information from the press brake 100.

Certainly, the predictor management in the present embodiment can be implemented in the entire management system 190 provided with the management server device 140 as described above. Note that, however, the predictor management in the present embodiment can also be implemented in the press brake 100 alone. Accordingly, hereinafter, description will be given mainly on the predictor management in the press brake 100 alone, but the present invention is not limited to this. Note that the present embodiment can be widely used for a machine tool that makes use of a hydraulic cylinder other than the press brake 100 shown in FIG. 1.

[Hydraulic Circuit of Press Brake]

Figure 2:
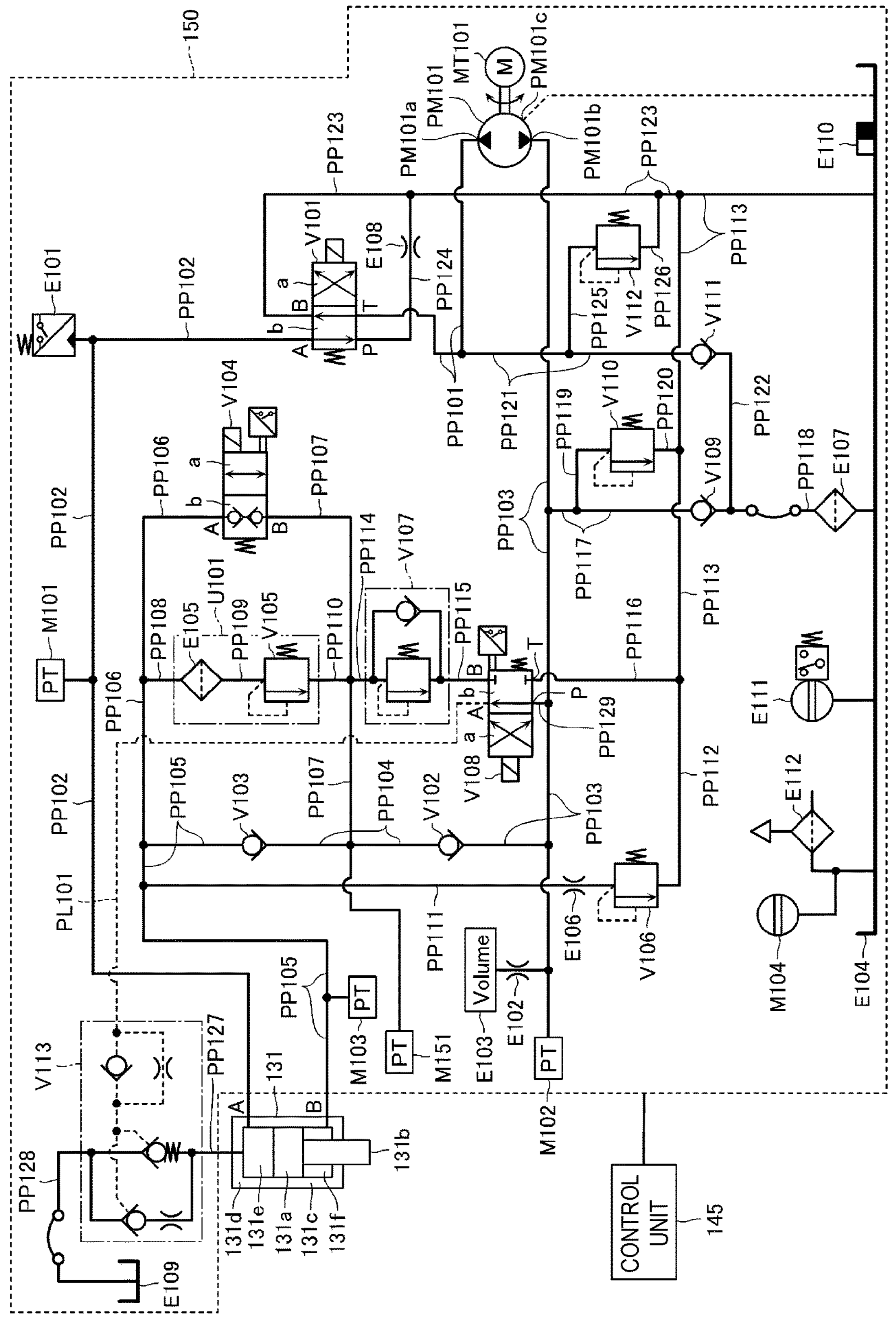
FIG. 2 is a diagram showing a hydraulic circuit and a control unit of a hydraulic cylinder in a press brake of the management system.

First, as a premise for the predictor management of the press brake 100 according to the present embodiment, the hydraulic circuit 150 of the hydraulic cylinders 131, 132 in the press brake 100 will be described with reference to FIG. 2. Note that FIG. 2 shows the hydraulic cylinder 131, the hydraulic circuit 150 of the hydraulic cylinder 131, and the control unit 145 configured to control the hydraulic circuit 150. Since the hydraulic circuit of the hydraulic cylinder 132 is the same as the hydraulic circuit 150, the description thereof will be omitted.

The hydraulic cylinder 131 of the press brake 100 has a piston 131*a*, a rod 131*b* mounted in the piston 131*a*, a substantially cylindrical cylinder tube 131*c* encompassing the piston 131*a* and the rod 131*b*, and a cylinder head 131*d* covering an upper portion of the cylinder tube 131*c*. In addition, the hydraulic circuit 150 is provided with a fluid pump PM101 configured to circulate hydraulic oil throughout the hydraulic circuit 150 and an AC servomotor MT101 configured to rotationally drive the fluid pump PM101.

The fluid pump PM101 according to the present embodiment is a bidirectional pump. Hereinafter, in the description, the direction of the fluid pump PM101 from a primary side PM101*a* to a secondary side PM101*b* is referred to as "a forward direction", and the opposite direction from the secondary side PM101*b* to the primary side PM101*a* is referred to as "a reverse direction". The primary side PM101*a* of the fluid pump PM101 is connected to a port A leading to an upper cylinder chamber 131*e* of the hydraulic cylinder 131 via a piping PP101, a directional control valve V101, and a piping PP102.

The directional control valve V101 is, for example, a 4-port 2-position valve. At a position a, the directional control valve V101 is opened between a port A and a port T and opened between a port B and a port P. On the other hand, at a position b, the directional control valve V101 is opened between the port A and the port P and opened between the port B and the port T.

The piping PP101 connects the primary side PM101*a* of the fluid pump PM101 and the port T of the directional control valve V101. The piping PP102 connects the port A of the directional control valve V101 and the port A of the hydraulic cylinder 131. The piping PP102 is provided with a pressure switch E101 and a pressure gauge M101. The pressure gauge M101 measures the hydraulic pressure of the hydraulic oil in the upper cylinder chamber 131*e* of the hydraulic cylinder 131.

The secondary side PM101*b* of the fluid pump PM101 is connected to a port B leading to a lower cylinder chamber 131*f* of the hydraulic cylinder 131 via a piping PP103, a check valve V102, a piping PP104, a check valve V103, and a piping PP105. The piping PP103 is provided with a volume E103 connected via an orifice E102, and a pressure gauge M102.

The pressure gauge M102 measures the hydraulic pressure of the hydraulic oil of the secondary side PM101*b* of the fluid pump PM101. Note that the piping PP105 is provided with a pressure gauge M103. The pressure gauge M103 measures the hydraulic pressure of the hydraulic oil in the lower cylinder chamber 131*f* of the hydraulic cylinder 131. In addition, a pressure gauge M151 is provided to the piping PP104 and a piping PP107 that will be described later. The pressure gauge M151 measures the hydraulic pressure of the hydraulic oil downstream of a pressure control valve V105 as a first pressure control valve that will be described later. Then, surplus hydraulic oil in the fluid pump PM101 is discharged from a drain opening PM101*c* to an oil tank E104.

Note that the piping PP105 of the hydraulic circuit 150 is also connected to the piping PP104 through a path from a piping PP106, a directional control valve V104, to the piping PP107. The directional control valve V104 is, for example, a 2-port 2-position valve, and is opened between a port A and a port B at a position a, and closed between the port A and the port B at a position b.

The piping PP106 connects the piping PP105 and the port A of the directional control valve V104. The piping PP107 connects the port B of the directional control valve V104 and the piping PP104. A pressure control unit U101 configured to control the back pressure of the hydraulic oil on the port B side of the hydraulic cylinder 131 is provided between the piping PP106 and the piping PP107 in parallel with the directional control valve V104.

The pressure control unit U101 has a piping PP108, a filter E105, a piping PP109, a pressure control valve V105, and a piping PP110 each connected from the piping PP106 to the piping PP107. Note that the piping PP105 is connected to the oil tank E104 via a piping PP111 provided with an orifice E106, a pressure control valve V106, a piping PP112, and a piping PP113.

The piping PP107 is connected to the piping PP113 via a piping PP114, a pressure control valve V107, a piping PP115, a directional control valve V108, and a piping PP116. The directional control valve V108 is, for example, a 4-port 2-position valve. At a position a, the directional control valve V108 is opened between a port A and a port T and opened between a port B and a port P. On the other hand, at a position b, the directional control valve V108 is opened between the port A and the port P and closed between the port B and the port T.

The piping PP115 connects the pressure control valve V107 and the directional control valve V108. In addition, the piping PP116 connects the port T of the directional control valve V108 and the piping PP113. Note that the piping PP103 is connected to the oil tank E104 via a piping PP117, a check valve V109, a piping PP118, and a filter E107.

In addition, the piping PP117 is connected to the oil tank E104 via a piping PP119, a pressure control valve V110, a piping PP120, and the piping PP113. The piping PP101 is connected to the oil tank E104 via a piping PP121, a check valve V111, a piping PP122, the piping PP118, and the filter E107. The piping PP121 is connected to the oil tank E104 via a piping PP125, a pressure control valve V112, a piping PP126, a piping PP123, and the piping PP113.

Note that the port B of the directional control valve V101 is connected to the oil tank E104 via the piping PP123 and the piping PP113. In addition, the port B of the directional control valve V101 is connected to the port P of the directional control valve V101 via the piping PP123 and a piping PP124 provided with an orifice E108.

The upper cylinder chamber 131*e* of the hydraulic cylinder 131 is connected from the cylinder head 131*d* thereof to an oil tank E109 via a piping PP127, a prefill valve V113, and a piping PP128. The prefill valve V113 is opened by a pilot signal PL101 supplied from the directional control valve V108.

The pilot signal PL101 is supplied from the port A of the directional control valve V108 at the position b via the piping PP103, a piping PP129, and the port P of the directional control valve V108. In addition, the oil tank E104 is provided with a magnet E110, a float switch E111, an air breather E112, and an oil level gauge M104. The above is the configuration of the hydraulic circuit 150 according to the present embodiment.

Next, normal operation of the hydraulic circuit 150 will be described.

[Stopping of Upper Table]

First, stopping of the upper table 110 will be described.

In order to stop the upper table 110, the directional control valve V104 is switched to the position b by the control unit 145. Thereby, a self-weight of the upper table 110 is supported by the check valve V103, the directional control valve V104, the pressure control valve V105, and the pressure control valve V106. Note that the operation of the fluid pump PM101 is stopped in this situation.

Here, the pressure applied to the rod 131*b* of the hydraulic cylinder 131 gradually decreases to be the self-weight pressure of the upper table 110 due to leakage, flow rate loss, and pressure loss of the hydraulic oil in the respective valves from V103 to V106, the hydraulic cylinder 131, and the like. Note that the leakage amount of the hydraulic oil varies depending on the individual specificity of a device.

[Self-Weight Lowering of Upper Table]

Subsequently, self-weight lowering (high-speed lowering) of the upper table 110 will be described.

In order to lower the upper table 110 by its self-weight, the directional control valve V101, the directional control valve V104, and the directional control valve V108 are switched to the positions a, respectively, by the control unit 145. Thereby, a path is opened from the port B of the hydraulic cylinder 131, via the directional control valve V104, the pressure control valve V107, the directional control valve V108, the secondary side PM101*b* of the fluid pump PM101, the primary side PM101*a* of the fluid pump PM101, and the directional control valve V101, to the port A of the hydraulic cylinder 131.

Here, the hydraulic oil is caused to flow in the reverse direction by the fluid pump PM101. Then, the hydraulic oil is drained from the lower cylinder chamber 131*f* of the hydraulic cylinder 131 through the above path, and the upper table 110 starts to lower by its self-weight. On the other hand, a negative pressure is generated in the upper cylinder chamber 131*e* of the hydraulic cylinder 131, and the negative pressure causes a large amount of hydraulic oil to be supplied from the oil tank E109 to the upper cylinder chamber 131*e* via the prefill valve V113. As a result, the upper table 110 lowers at a high speed.

[Bending Lowering of Upper Table]

Subsequently, bending lowering (low-speed lowering) of the upper table 110 will be described.

At the time when the upper table 110 is lowered to reach a predetermined position (a speed switching position), the control unit 145 switches the directional control valve V104 to the position b to close the flow path. Thereby, the hydraulic oil flowing through the directional control valve V104 from the port B of the hydraulic cylinder 131 starts to flow through the pressure control valve V107 via the pressure control valve V105, which opens a path from the port B of the hydraulic cylinder 131, via the pressure control valve V105, the pressure control valve V107, the directional control valve V108, the secondary side PM101*b* of the fluid pump PM101, the primary side PM101*a* of the fluid pump PM101, and the directional control valve V101, to the port A of the hydraulic cylinder 131.

In this case, since the flow rate of the hydraulic oil from the port B of the hydraulic cylinder 131 is limited by the back pressure of the pressure control valve V105 and the pressure control valve V107, the lowering speed of the upper table 110 decreases. On the other hand, since the hydraulic oil is supplied from the fluid pump PM101 to the upper cylinder chamber 131*e* of the hydraulic cylinder 131, the rod 131*b* is pushed down by a strong force, which enables the workpiece W to be bent.

Note that the hydraulic oil is supplied to the fluid pump PM101 from the oil tank E104 via the filter E107 and the check valve V109. In addition, the hydraulic oil is supplied from the fluid pump PM101 to the upper cylinder chamber 131*e* of the hydraulic cylinder 131 via the directional control valve V101.

[Elevation/Forcible Elevation of Upper Table]

Subsequently, elevation or forcible elevation of the upper table 110 will be described.

In order to elevate or forcibly elevate the upper table 110, the directional control valve V108 is switched to the position b by the control unit 145. Then, the hydraulic oil is caused to flow in the forward direction by the fluid pump PM101. Thereby, the hydraulic oil is supplied from the oil tank E104 to the lower cylinder chamber 131*f* of the hydraulic cylinder 131 via the filter E107, the primary side PM101*a* of the fluid pump PM101, the secondary side PM101*b* of the fluid pump PM101, the piping PP103, the check valve V102, and the check valve V103.

In addition, as the hydraulic oil flowing through the piping PP103 is supplied to the port P of the directional control valve V108, the pilot signal PL101 is supplied from the port A of the directional control valve V108 to the prefill valve V113. Thereby, the hydraulic oil in the upper cylinder chamber 131*e* of the hydraulic cylinder 131 is discharged to the oil tank E109 via the prefill valve V113. As a result, a negative pressure is generated in the piston 131*a*, and the upper table 110 is elevated.

The above is the operation of the hydraulic circuit 150 according to the present embodiment, but the following problem may occur due to the mixing of contamination. That is, if contamination is mixed in the hydraulic circuit 150, any of the valves may be clogged with the contamination, leading to a malfunction in the hydraulic circuit 150. In the case of the press brake 100, the hydraulic cylinder 131 is often operated at a low speed, which means the hydraulic oil is circulated through the hydraulic circuit 150 at a relatively low flow rate.

For this reason, once the valve is clogged with the contamination, the contamination is less likely to be flown again and as a result, stays in the valve. Particularly, since the pressure control valve V105 of the pressure control unit U101 has a narrow flow path and is used for operations such as stopping and bending lowering of the upper table 110, the flow of the hydraulic oil in the valve is also slow.

In addition, since the hydraulic oil flows only in one direction, the clogging of the contamination is less likely to be resolved. Then, when the pressure control valve V105 is clogged with contamination, the hydraulic oil leaks during the stopping and the bending lowering of the upper table 110, and the pressure in the lower cylinder chamber 131*f* of the hydraulic cylinder 131 cannot be controlled.

As a result, the self-weight of the upper table 110 cannot be sufficiently supported, and a malfunction occurs such as being unable to stop, or dropping at a speed exceeding a designed value. Further, if a difference is generated between the operation of the hydraulic circuit 150 of the hydraulic cylinder 131 and the operation of the hydraulic circuit (not shown) of the hydraulic cylinder 132, the upper table 110 is inclined, which significantly affects the processing of the workpiece W.

Therefore, in the present embodiment, in order to prevent the press brake 100 from entering the state as described above to malfunction or stop in an emergency, the predictor of an occurrence of an abnormality in the hydraulic circuit 150 is managed in advance by the control unit 145.

Specifically, the control unit 145 is configured to determine a predictor of an occurrence of an abnormality while monitoring the state of the press brake 100 in real time, so as to make a proactive response to prevent an occurrence of an abnormality when the predictor of the occurrence of an abnormality is detected by the predictor determination. In addition, the control unit 145 is able to execute not only a control in which a predictor is determined by using each predictor determination threshold value that will be described later, but also a control in which the press brake 100 is stopped in an emergency by determining an abnormality by using an abnormality determination threshold value for detecting an abnormality that has actually occurred.

[Predictor Determination]

Here, the predictor determination that can be performed by the control unit 145 includes a method in which a predictor of an occurrence of an abnormality in the pressure control unit U101 (the pressure control valve V105) of the hydraulic circuit 150 is determined based on (1) a moving speed (lowering speed) of the upper table 110, (2) the pressure at least upstream of the pressure control valve V105, and/or (3) a monitor signal of the pressure control valve V105. Note that various methods other than the method of the predictor determination described below can be adopted.

Specifically, with respect to the above (1), the control unit 145 obtains the detected current position information of the upper table 110 in real time from the linear scale 111 connected to the upper table 110. Then, a lowering speed of the upper table 110 per unit time is calculated based on the obtained current position information.

Then, the control unit 145 determines a predictor of an occurrence of an abnormality in the control valve V105 by comparing the calculated lowering speed with a preset predictor determination threshold value, and then by determining whether or not the lowering speed exceeds the predictor determination threshold value. In this case, the faster the lowering speed of the upper table 110, the more leakage of the hydraulic oil is to be recognized in the hydraulic circuit 150. Therefore, the predictor determination threshold value is set to a value that is detected earlier than the abnormality determination threshold value, that is, a value lower than the abnormality determination threshold value.

Thereby, the predictor determination can be performed in a shorter time and in a more accurate manner than the determination simply with a lowering amount of the upper table 110. In addition, even in a normal press brake 100, the upper table 110 is inevitably lowered due to its self-weight although the lowering is slow and minute. For this reason, in the method in which a determination is performed simply with a lowering amount of the upper table 110, it is difficult to distinguish between the lowering of the upper table 110 inevitably generated by its self-weight and the lowering of the upper table 110 caused by contamination, but in the method in which a determination is performed with a lowering speed having the concept of time, it is possible to easily distinguish such lowering so that accurate predictor determination can be performed. Further, according to the above method (1), it is possible to predict an occurrence of an abnormality in the entire hydraulic circuit 150.

Note that, as described in the above (1), although the method in which a determination is performed with a lowering speed having the concept of time enables a more accurate predictor determination, the control unit 145 may determine a predictor of an occurrence of an abnormality by monitoring a self-weight drop amount of the upper table 110 during the stopping and the bending lowering of the upper table 110. In this case, if the self-weight drop amount of the upper table 110 is larger than the design-wise allowable self-weight drop amount (the set predictor determination threshold value), it can be determined that an abnormality may occur. In this case, the larger the self-weight drop amount of the upper table 110, the more leakage of the hydraulic oil is to be recognized in the hydraulic circuit 150. Therefore, the predictor determination threshold value is set to a value that is detected earlier than the abnormality determination threshold value, that is, a value lower than the abnormality determination threshold value. Note that when monitoring the self-weight drop amount of the upper table 110, it is also possible to determine, for example, the timing of replacing the hydraulic oil and the like based on the relationship between the monitor data and the past operation information.

In addition, specifically with respect to the above (2), the control unit 145 determines a predictor of an occurrence of an abnormality in the pressure control valve V105 by monitoring in real time an indicated value of the pressure gauge M103 of the hydraulic circuit 150, that is, the hydraulic pressure of the hydraulic oil upstream of the pressure control valve V105, and then by detecting that the indicated value (hydraulic pressure) has fallen below a preset predictor determination threshold value.

Note that, instead of the method in which predictor determination is performed based on the indicated value of the pressure gauge M103 (the hydraulic pressure of the hydraulic oil upstream of the pressure control valve V105), a method may be adopted in which a predictor of an occurrence of an abnormality is determined by monitoring in real time a difference in the indicated value between the pressure gauge M103 and the pressure gauge M151 of the hydraulic circuit 150, that is, a difference in the hydraulic pressure of the hydraulic oil before and after the pressure control valve V105, and then by comparing this difference in the hydraulic pressure with a preset predictor determination threshold value.

In these cases, the lower the hydraulic pressure of the hydraulic oil upstream of the pressure control valve V105, and as a result, the smaller the difference in the hydraulic pressure of the hydraulic oil before and after the pressure control valve V105, the more leakage is to be recognized from the pressure control valve V105. Therefore, the predictor determination threshold value is set to a value that is detected earlier than the abnormality determination threshold value, that is, a value higher than the abnormality determination threshold value. In these methods, it is also possible to perform accurate predictor determination. In addition, according to these methods, it is possible to predict an occurrence of an abnormality in the pressure control valve V105.

Further, specifically with respect to the above (3), a pressure control valve with a monitoring function for detecting an abnormality in the valve is used as the pressure control valve V105. Then, the control unit 145 determines a predictor of an occurrence of an abnormality in the pressure control valve V105 based on a monitor signal indicating a position in the valve, which is transmitted by the monitoring function of the pressure control valve V105. In this case, the determination condition for the predictor determination is set to be more relaxed than the condition for the abnormality determination so that the predictor determination is performed earlier than the abnormality determination. In the method as described above, it is also possible to perform accurate predictor determination.

Note that the control unit 145 is also capable of performing composite predictor determination in which various types of predictor determination described above are combined. For example, the control unit 145 may be configured to perform the predictor determination of the above (1) in combination with the predictor determination of the above (2) or (3). In the case of this composite predictor determination, while predicting an occurrence of an abnormality in the entire hydraulic circuit 150 by the predictor determination of the above (1), it is possible to determine, by the predictor determination of the above (2) or (3), whether or not the position where an abnormality may occur is the pressure control valve V105.

Then, according to the composite predictor determination as described above, it is possible to enhance work efficiency of abnormality preventive measures by promptly and easily specifying a position where an abnormality may occur while ensuring safety and stable operability of the press brake 100 by promptly detecting a predictor of an occurrence of an abnormality in the entire hydraulic circuit 150. That is, though it is generally difficult to recognize clogging of contamination or the like in the pressure control valve V105 unless it is recovered and disassembled, it is possible to detect a predictor of an occurrence of an abnormality in the pressure control valve V105, to take measures without recovery and replacement, and to promptly make arrangement for replacement parts, according to the predictor determination of the above (2) or (3). In addition, though it is difficult to detect a predictor of an occurrence of an abnormality in other parts of the hydraulic circuit 150 only by monitoring the pressure control valve V105, the predictor determination of the above (1) enables a predictor of an occurrence of an abnormality in the entire hydraulic circuit 150 to be determined, thereby making it possible to ensure safety and stable operability.

[Proactive Response]

In addition, the proactive response that can be taken by the control unit 145 when a predictor of an occurrence of an abnormality is detected includes a response in which a predictor of an abnormality is reported in the press brake 100, a response in which a predictor of an abnormality is reported to the management server device 140, and/or a response in which an occurrence of an abnormality is prevented by a duplex circuit operation that will be described later.

Specifically, if the occurrence of an abnormality in the hydraulic circuit 150 is predicted as a result of the predictor determination, the control unit 145 of the press brake 100 notifies the operator S or the like of a predictor of the abnormality by sounding an alarm or displaying a message to that effect on the display screen 133*a* of the operation panel 133 before the press brake 100 actually applies an emergency stop.

In addition, the control unit 145 of the press brake 100 transmits the result of the predictor determination to the management server device 140 together with or instead of the report on the predictor. Thereby, it is possible to report to the service staff or the maintenance contractor before an emergency stop, which enables the service staff or the maintenance contractor to be dispatched to the site and to take measures such as replacement of parts before a failure such as an emergency stop occurs.

Further, when the hydraulic circuit 150 is a hydraulic circuit 150A having a duplex circuit that will be described later, the control unit 145 of the press brake 100 can perform the duplex circuit operation that will be described later together with at least one of the reporting to the operator S and the reporting to the management server device 140 or instead of such reporting. According to this duplex circuit operation, since the pressure control valve in which an abnormality has been predicted can be separated from the hydraulic circuit, a failure such as an emergency stop can be prevented in advance. In addition, since it is possible to specify easily and promptly that a part in which an abnormality may occur is a pressure control valve, it is possible to promptly take measures such as arranging replacement parts.

Note that the above-described predictor management (the predictor determination and the proactive response) is performed in a state in which a table on a movable side, which is the upper table 110 in the present embodiment, is stopped. For example, in a state in which the upper table 110 is temporarily stopped, the above-described predictor management can be performed by automatic operation or by manual operation of the operator. In addition, a predetermined time difference (time lag) from the power-off operation of the operator to the actual powered-off state of the press brake 100 may be provided, so as to perform the above-described predictor determination automatically within the time lag. In this case, every time the press brake 100 is shut down, the predictor determination can be performed automatically. In this case, if a predictor of an occurrence of an abnormality is detected within the time lag, the shutdown may be canceled to take the above-described proactive response, or the above-described proactive response may be performed at the next startup.

In addition, if the press brake 100 is provided with a sub-battery, the predictor management (the predictor determination and the proactive response) by the control unit 145 can be performed 24 hours a day. That is, generally, when the main power supply is turned off after the press brake 100 is in a so-called ram lock state, for example, after the operation is completed, it is difficult to perform, for example, the predictor determination by the above methods (1) to (3) and the above proactive response. However, if the press brake 100 is provided with the sub-battery and is configured to be able to secure the electric power from the sub-battery at least for the control unit 145 while the main power is off, it is possible to configure the predictor management in a sustainable manner by monitoring the state of the hydraulic circuit 150, whether it is during the hours of operation or it is during the hours of non-operation.

Next, an operation example of the above predictor management will be described.

[Operation Flow of First Operation Example]

Figure 3:
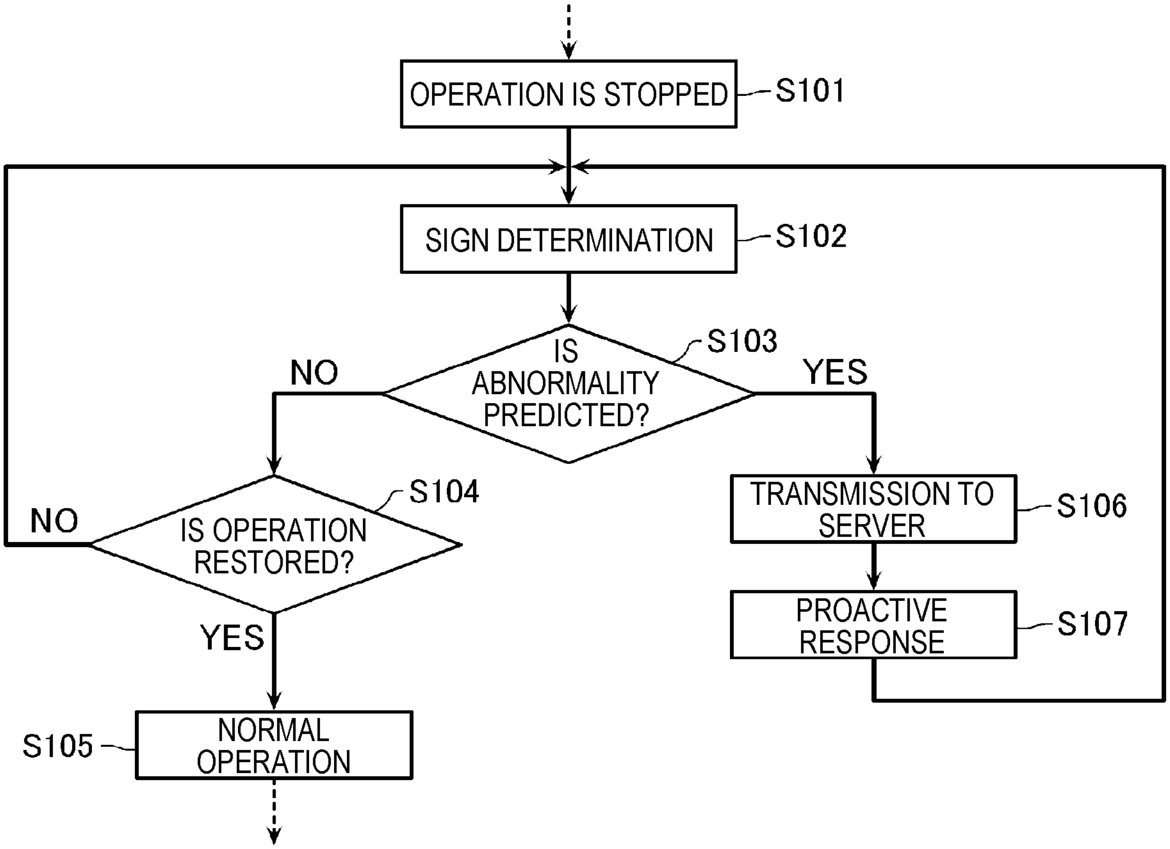
FIG. 3 is a flowchart showing an example of an operation flow of the press brake.

FIG. 3 is a first operation example, which is an example in which the control unit 145 determines a predictor of an occurrence of an abnormality in the hydraulic circuit 150 and reports to the operator S at the site, the service staff in a remote place, or the like when the occurrence of an abnormality is predicted.

First, when the operation of the press brake 100 that has been normally operated is stopped in a manner of the above-described “the stopping of the upper table” in Step S101, the control unit 145 performs predictor determination in Step S102 until the operation is restored. In the predictor determination of Step S102, it is monitored whether or not an occurrence of an abnormality is predicted in the pressure control unit U101 (the pressure control valve V105) by using the above-described (1) to (3) and other methods (Step S103).

Here, if the occurrence of an abnormality is not predicted (NO in Step S103), the predictor determination is continuously performed until the operation is restored (NO in Step S104). Then, when the operation is restored (YES in Step S104), the predictor determination is discontinued and the normal operation is resumed (Step S105).

On the other hand, if the occurrence of an abnormality is predicted (YES in Step S103), the control unit 145 transmits abnormality prediction information indicating that the abnormality has been predicted, for example, to the management server device 140 via the communication network 180 (Step S106), which causes the press brake 100 itself or the management server device 140 that has received the abnormality prediction information to make a proactive response (Step S107). Thereafter, the predictor determination is continuously performed until the operation is restored.

Note that the proactive response in Step S106 includes various actions that can be taken before an abnormality actually occurs. For example, the proactive response includes reporting the predictor of an abnormality to the operator S or the like who is at the site by sounding an alarm of the press brake 100, or displaying a message to that effect on the display screen 133*a* of the operation panel 133. In addition, another proactive response includes transmitting the result of the predictor determination to the management server device 140 before the press brake 100 actually stops in an emergency or an alarm is sounded, so as to report to the service staff or the maintenance contractor in a remote place via the management server device 140 so that dispatchment of the service staff or the maintenance contractor to the site is arranged and measures such as replacement of parts are taken.

The above is the operation flow of the press brake 100 in the first operation example.

Note that in the present embodiment, the above predictor determination is described as being performed on the side of the press brake 100, but the present invention is not limited to this. The above predictor determination may be performed on the side of the management server device 140.

As described above, in the present embodiment, the control unit 145 or the management server device 140 of the press brake 100 can determine a predictor of an occurrence of an abnormality such as mixing of contamination in the hydraulic circuit 150. Therefore, it is possible to make an appropriate proactive response before the operation of the press brake 100 is completely stopped.

[Another Hydraulic Circuit of Press Brake]

Next, the another hydraulic circuit 150A of the hydraulic cylinder 131 in the press brake 100 according to another embodiment of the present invention will be described with reference to FIG. 4. Note that hereinafter, since the same components as those of the hydraulic circuit 150 among the components of the hydraulic circuit 150A are denoted by the same reference numerals, redundant descriptions will be omitted.

Figure 4:
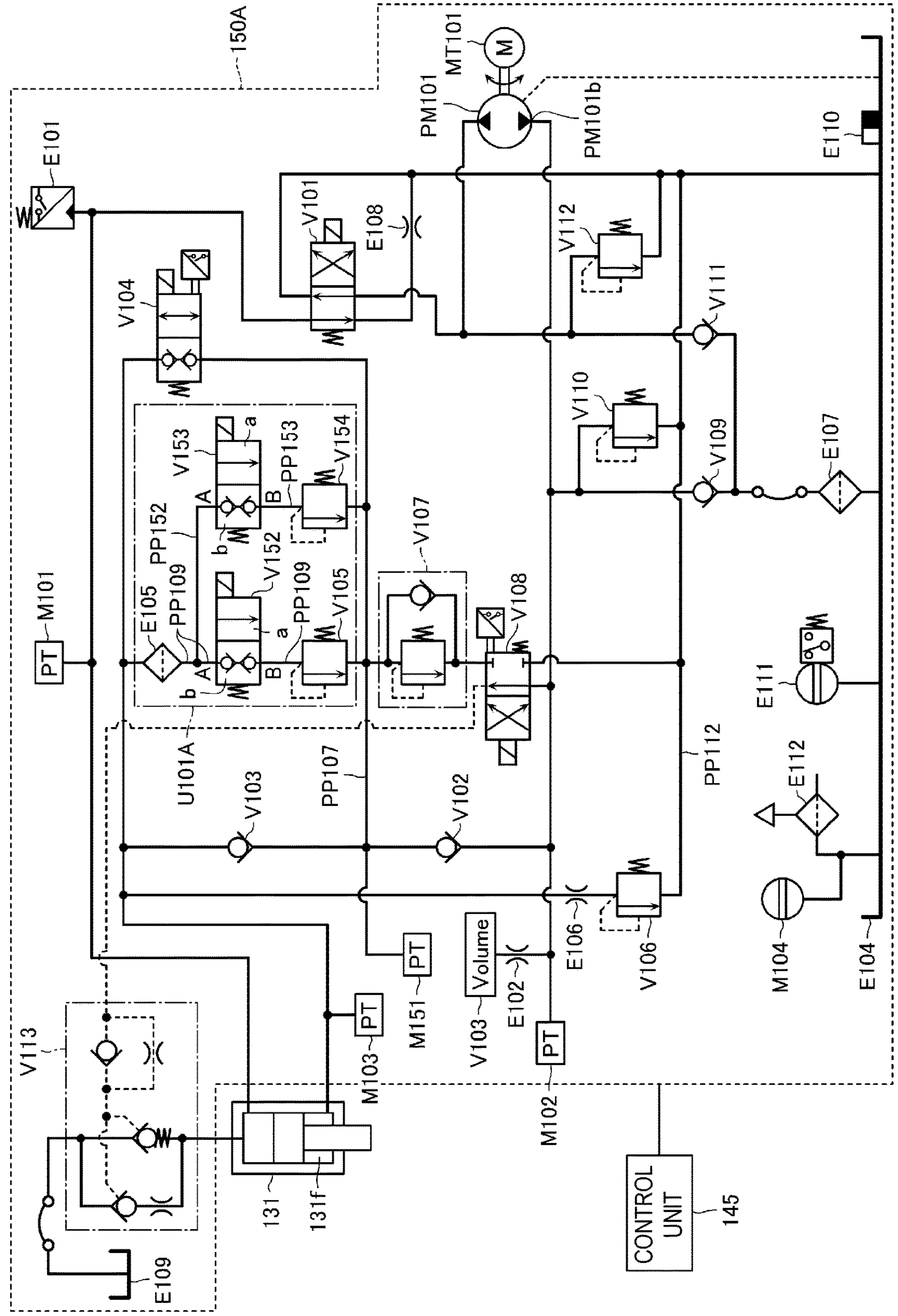
FIG. 4 is a diagram showing another hydraulic circuit and another control unit of the hydraulic cylinder in the press brake according to another embodiment of the present invention.

As shown in FIG. 4, with respect to the hydraulic circuit 150, the hydraulic circuit 150A has a pressure control unit U101A in place of the pressure control unit U101. The pressure control unit U101A has the filter E105 and the pressure control valve V105 in the same manner as the pressure control unit U101, as well as a directional control valve V152 provided upstream of the pressure control valve V105, a directional control valve V153 provided in parallel to the directional control valve V152 and the pressure control valve V105, and a pressure control valve V154 as a second pressure control valve.

The directional control valve V152 is a 2-port 2-position valve configured to control an inflow of the hydraulic oil into the pressure control valve V105, and is opened between a port A and a port B at a position a, and closed between the port A and the port B at a position b. The directional control valve V153 is a 2-port 2-position valve configured to control an inflow of the hydraulic oil into the pressure control valve V154, and is opened between a port A and a port B at position a, and closed between the port A and the port B at a position b. The port A of the directional control valve V153 is connected to a piping PP109 between the filter E105 and the directional control valve V152 via a piping PP152. In addition, the port B of the directional control valve V153 is connected to a pressure control valve V154 via a piping PP153.

Note that in the present embodiment, the directional control valves (the directional control valve V152 and the directional control valve V153) capable of switching between opening and closing between the port A and the port B are provided upstream of the pressure control valve V105 and the pressure control valve V154, respectively, but the present invention is not limited to this. For example, one directional control valve (not shown) capable of switching between a state of communicating with the pressure control valve V105 and a state of communicating with the pressure control valve V154 may be provided upstream of the pressure control valve V105 and the pressure control valve V154.

[Operation of Another Hydraulic Circuit]

Next, with respect to the operation of the hydraulic circuit 150A, differences from that of the hydraulic circuit 150 will be described. The hydraulic circuit 150A can perform the duplex circuit operation, in addition to the stopping, the self-weight lowering, the lowering bending, and the elevation or the forcible elevation of the upper table 110 of the hydraulic circuit 150. This duplex circuit operation is an operation in which the back pressure of the hydraulic oil on the port B side of the hydraulic cylinder 131 is controlled by the pressure control valve V154 in place of the pressure control valve V105 when the pressure control valve V105 is clogged with contamination.

During normal operation of the press brake 100, the directional control valve V152 of the pressure control unit U101A is at the position a, and the directional control valve V153 thereof is at the position b. In this case, the hydraulic pressure in the lower cylinder chamber 131*f* of the hydraulic cylinder 131 is controlled by the pressure control valve V105 via the filter E105 and the directional control valve V152.

Here, in order to perform the duplex circuit operation, the directional control valve V152 and the directional control valve V153 are switched to the position b and the position a, respectively. Thereby, the control body of the hydraulic pressure of the lower cylinder chamber 131*f* of the hydraulic cylinder 131 can be switched from the pressure control valve V105 to the pressure control valve V154.

When the duplex circuit operation as described above is utilized, it is possible to immediately restore the hydraulic circuit 150A if a predictor is detected that the pressure control valve V105 may be clogged with contamination or even if the pressure control valve V105 is actually clogged with contamination. In addition, by determining whether or not the duplex circuit operation has resolved the predictor determination, it is possible to promptly and easily specify whether or not the position where an abnormality may occur is the pressure control valve. Note that the duplex circuit operation may be started not only by the control by the control unit 145 but also by an instruction of the operator S.

Next, an operation example of the predictor management in the hydraulic circuit 150A will be described.

[Operation Flow of Second Operation Example]

Figure 5:
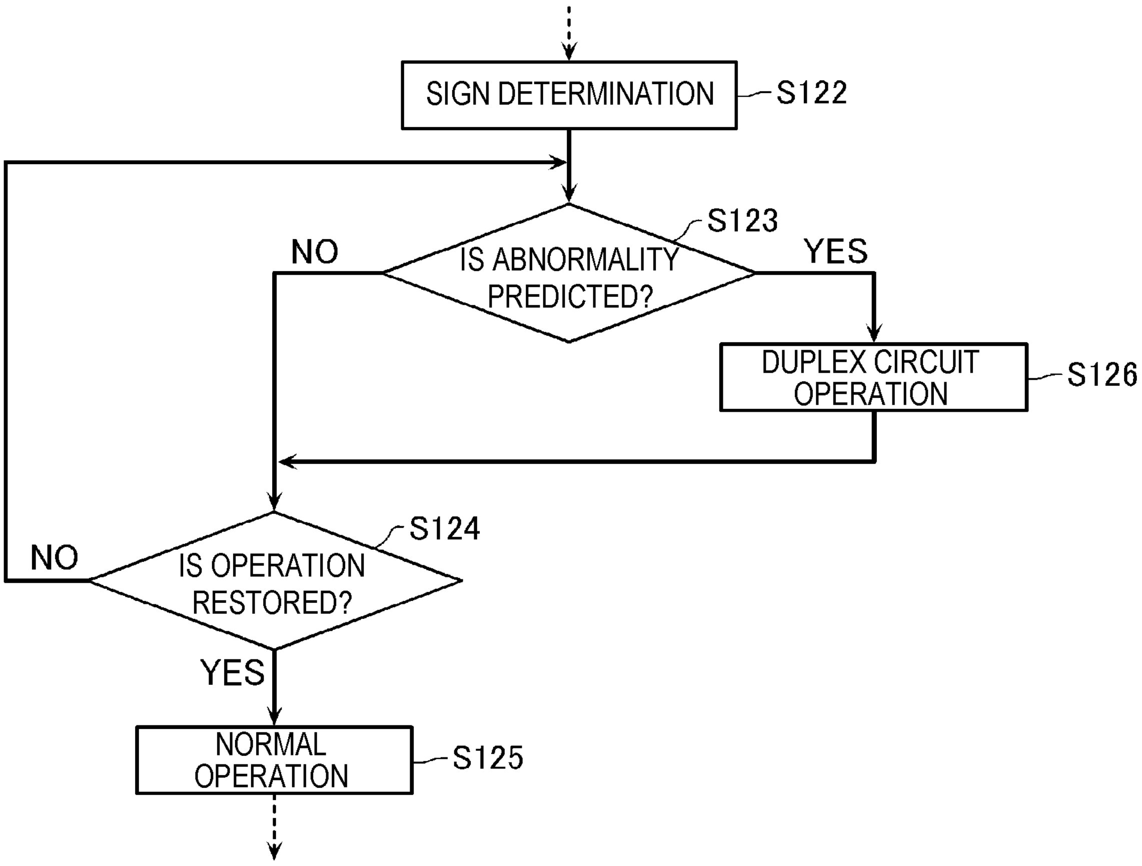
FIG. 5 is a flowchart showing another example of the operation flow of the press brake.

FIG. 5 is an operation example of the duplex circuit operation as a second operation example, which is an example in which the control unit 145 determines a predictor of an occurrence of an abnormality in the hydraulic circuit 150A and causes the duplex circuit operation to be performed when the occurrence of an abnormality. is predicted.

First, when the operation of the press brake 100 that has been normally operated is stopped in a manner of the above-described "the stopping of the upper table", the control unit 145 performs predictor determination in Step S122 until the operation is restored. Here, if the occurrence of an abnormality is not predicted (NO in Step S123), the predictor determination is continuously performed until the operation is restored (NO in Step S124). Then, when the operation is restored (YES in Step S124), the predictor determination is discontinued and the normal operation is resumed (Step S125). On the other hand, if the occurrence of an abnormality is predicted (YES in Step S123), the duplex circuit operation is performed in Step S126.

In order to perform the duplex circuit operation, the directional control valve V152 is switched from the position a to the position b, and the directional control valve V153 is switched from the position b to the position a, respectively. In this manner, the control body of the hydraulic pressure of the hydraulic oil in the lower cylinder chamber 131*f* of the hydraulic cylinder 131 is switched from the pressure control valve V105 to the pressure control valve V154. Particularly, when the predicted abnormality is generated due to the pressure control valve V105, it is assumed that this duplex circuit operation can restore the hydraulic circuit 150A. Thereafter, the predictor determination is continuously performed until the operation is restored (NO in Step S124). When the operation is restored (YES in Step S124), the predictor determination is discontinued and the normal operation is resumed (Step S125).

The above is the operation flow of the press brake 100 in the second operation example.

[Operation Flow of Third Operation Example]

Figure 6:
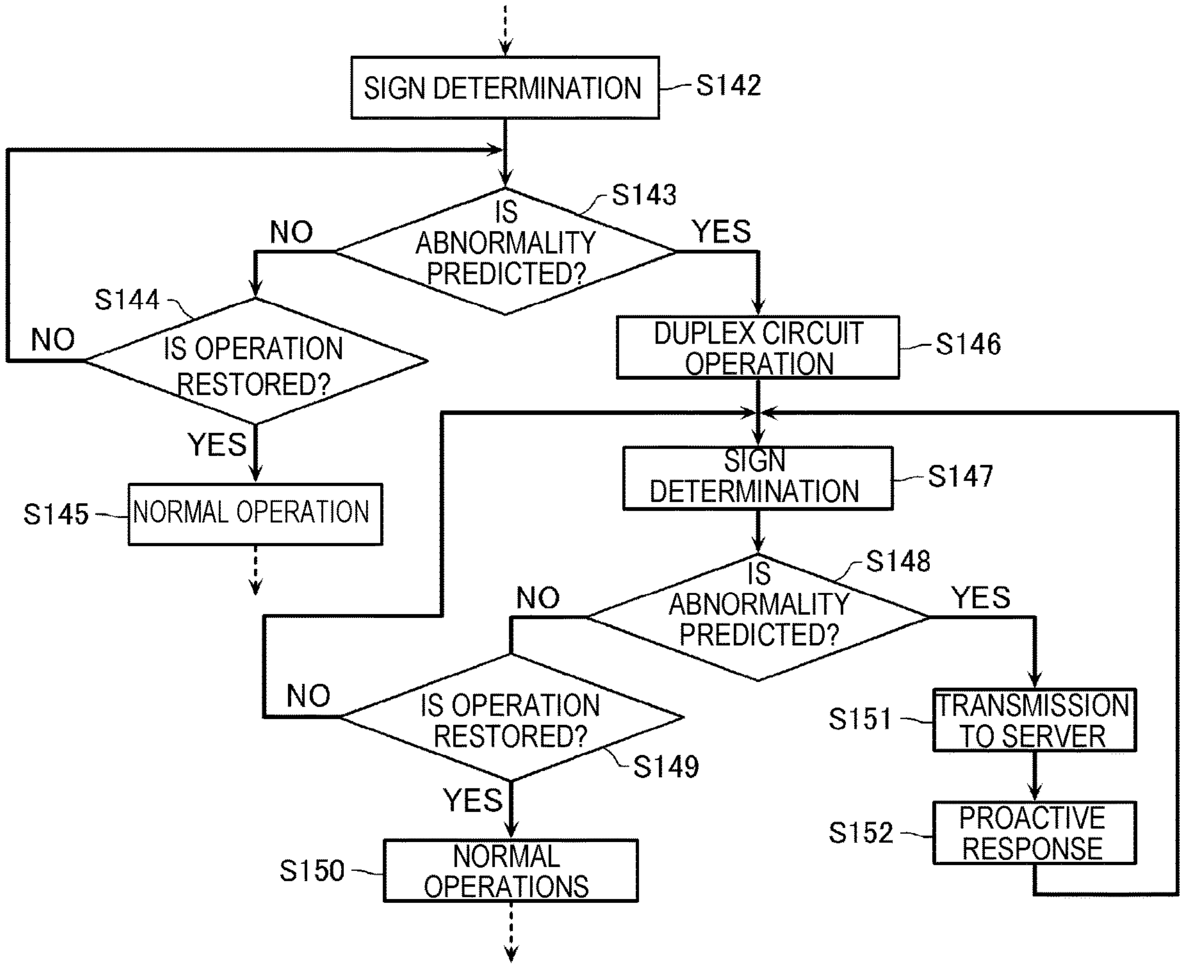
FIG. 6 is a flowchart showing still another example of the operation flow of the press brake.

FIG. 6 is an operation example in which the above first operation example and second operation example are combined.

First, when the operation of the press brake 100 that has been normally operated is stopped in a manner of the above-described "the stopping of the upper table", the control unit 145 performs predictor determination in Step S142 until the operation is restored. Here, if the occurrence of an abnormality is not predicted (NO in Step S143), the predictor determination is continuously performed until the operation is restored (NO in Step S144). Then, when the operation is restored (YES in Step S144), the predictor determination is discontinued and the normal operation is resumed (Step S145). On the other hand, if the occurrence of an abnormality is predicted (YES in Step S143), the duplex circuit operation as described above is performed (Step S146), and the hydraulic circuit 150A is restored.

Next, in Step S147, the same predictor determination as in Step S142 is performed in order to confirm that measures have been taken by the duplex circuit operation in Step S146. As a result, if the occurrence of an abnormality is not predicted (NO in Step S148), it can be said that the pressure control valve before switching is the cause of the predictor determination (the position where the abnormality may occur). Therefore, the control unit 145 transmits abnormality prediction information to the management server device 140, so that the press brake 100 or the management server device 140 makes a proactive response such as reporting or arranging replacement of parts (not shown). Then, as in Step S144, the predictor determination is continuously performed until the operation is restored (NO in Step S149). When the operation is restored (YES in Step S149), the predictor determination is discontinued and the normal operation is resumed (Step S150).

On the other hand, if the occurrence of an abnormality is predicted (YES in Step S148), it is determined that the cause of the occurrence of an abnormality predicted in the hydraulic circuit 150A has not been resolved, and the process proceeds to Step S151. In Step S151, the control unit 145 transmits the abnormality prediction information to the management server device 140. This causes the press brake 100 or the management server device 140 to make a proactive response (Step S152). Thereafter, the predictor determination is continuously performed until the operation is restored.

The above is the operation flow of the press brake 100 in the third operation example.

As described above, in the present embodiment, even if the one pressure control valve V105 (or the pressure control valve V154) is clogged with contamination, it is possible to control the back pressure of the hydraulic oil on the port B side of the hydraulic cylinder 131 by the other pressure control valve V154 (or the pressure control valve V105) in an instant manner by performing the duplex circuit operation. That is, according to the present embodiment, by combining the reporting and the duplex circuit operation in the predictor management, it is possible to provide the press brake and the management system that can be restored over a short period of time even if a malfunction of the hydraulic circuit 150A has occurred due to mixing of contamination or the like. In addition, by determining whether or not the duplex circuit operation has resolved the predictor determination, it is possible to promptly and easily specify whether or not the position where an abnormality may occur is a pressure control valve, which enables arrangements such as replacement of parts to be promptly made.

Although the embodiments of the present invention have been described above, these embodiments are presented by way of examples and are not intended to limit the scope of the invention. These novel embodiments can be implemented in other various forms, and various omissions, replacements, and changes can be made without departing from the spirit of the invention. These embodiments and their modifications are included in the scope and the gist of the invention, and are also included in the scope of the invention described in the claims and their equivalents.

For example, in the configuration of the above embodiment, the predictor determination is performed based on the lowering speed or the like of the upper table 110*a* of a descending press brake, in which the upper table 110 of the press brake 100 moves with respect to the lower table 120. This predictor determination can be also performed based on the falling speed or the like of the lower table 120 of an ascending press brake when the ascending press brake is stopped, in which the lower table 120 moves with respect to the upper table 110. Various aspects are possible as long as the predictor of an occurrence of an abnormality in the hydraulic pressure circuits 150, 150A of the hydraulic cylinders 131, 142 can be managed.

Figure 7:
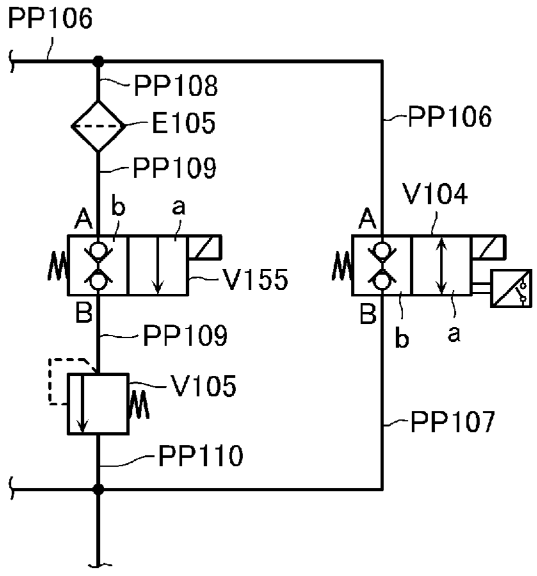
FIG. 7 is a diagram showing a part of the hydraulic circuit according to the still another embodiment.

In addition, in the above-described pressure control unit U101 of the hydraulic circuit 150 (see FIG. 2), in each of the above-described operations of "the stopping of the upper table", "the self-weight lowering of the upper table", and "the elevation/the forcible elevation of the upper table", it has been described that the pressure control valve V105 regulates the flow of the hydraulic oil. However, the present invention is not limited to this. For example, as shown in FIG. 7, a block valve V155 may be provided upstream of the pressure control valve V105 so that the block valve V155 regulates the flow of the hydraulic oil. In this case, as the block valve V155, a direction switching valve capable of switching between a conducting state and a non-conducting state can be adopted. As a result, in each of the above-described operations of "the stopping of the upper table", "the self-weight lowering of the upper table", and "the elevation/the forcible elevation of the upper table", the state becomes non-conductive to regulate the flow of the hydraulic oil, and in the above-described operation of "the bending lowering of the upper table", the state becomes conductive to allow the flow of the hydraulic oil.

By configuring the circuit in this manner, should the pressure control valve V105 be clogged with contamination, the block valve V155 provided immediately before the pressure control valve V105 can regulate the hydraulic oil to flow normally. As a result, it is possible to prevent in advance a failure such as an alarm report or an emergency stop due to the abnormality in the pressure control valve V105. In addition, it is also possible to adopt a configuration in which the flow of the hydraulic oil is regulated without using the valve V105, which is relatively likely to be clogged with contamination, by simultaneously switching both of the block valves V155 in the respective hydraulic circuits 150 of the pair of left and right hydraulic cylinders 131, 132 to a non-conductive state when the AC servomotor MT101 is stopped, so as to prevent the upper table 110 from being inclined, which is cause by leakage of the hydraulic oil from the pressure control valve V105 in one of the hydraulic circuits 150.

According to the hydraulic circuit utilizing the block valve V155, in addition to the above-described use mode of the block valve V155, the block valve V155 can be utilized, for example, as a new option of the above-described proactive response. That is, according to the hydraulic circuit as described above, when an occurrence of an abnormality in the pressure control valve V105 is predicted in the above-described predictor determination, and if the block valve V155 is switched to the non-conducting state, it is possible to regulate the flow of the hydraulic oil without using the control valve V105 in which the occurrence of an abnormality is predicted, thereby making it possible to prevent the occurrence of an abnormality in advance,

REFERENCE SIGNS LIST

100 Press brake
110 Upper table
111 Linear scale
120 Lower table
130 Side plate
131,132 Hydraulic cylinders
131*a* Piston
131*b* Rod
131*c* Cylinder tube
131*d* Cylinder head
131*e* Upper cylinder chamber
131*f* Lower cylinder chamber
133 Operation panel
133*a* Display screen
140 Management server device
145 Control unit
150, 150A Hydraulic circuits
180 Communication network
190 Management system

The invention claimed is:

1. A press brake, comprising:

a hydraulic cylinder configured to move an upper table and a lower table relative to each other in a vertical direction;

a control unit configured to control a hydraulic circuit of the hydraulic cylinder; and a position detector configured to detect position information in a moving direction of either one of the upper table and the lower table, the one moving relative to the other in a vertical direction, wherein the control unit has an abnormality determination threshold value for detecting an abnormality that has actually occurred and a predictor determination threshold value that is a value lower than the abnormality determination threshold value, the control unit is configured to compare a speed of self-weight movement per unit time calculated based on the position information from the position detector with the predictor determination threshold value and the abnormality determination threshold value while the one of the upper table and the lower table, the one moving relative to the other in a vertical direction, stops operation, when the control unit determines that the speed of self-weight movement exceeds the predictor determination threshold value and is below the abnormality determination threshold value, the control unit is configured to determines a predictor of an occurrence of an abnormality in the hydraulic circuit including a first pressure control valve configured to control a back pressure of hydraulic oil on a back pressure side port side of the hydraulic cylinder, and when the control unit determines that the speed of self-weight movement exceeds the abnormality determination threshold value, the control unit is configured to determine that the abnormality occurs in the hydraulic circuit.

2. The press brake according to claim 1, wherein the hydraulic circuit includes a second pressure control valve provided in parallel to the first pressure control valve and configured to control the back pressure of the hydraulic oil on the back pressure side port side of the hydraulic cylinder, and the control unit causes the second pressure control valve to control the back pressure side port side, instead of causing the first pressure control valve to control the back pressure side port side, with respect to the hydraulic circuit, when the abnormality is predicted in the hydraulic circuit as a result of the predictor determination.

3. The press brake according to claim 1, wherein the control unit transmits abnormality prediction information to a management server device, when the abnormality is predicted in the hydraulic circuit as a result of the predictor determination.

4. A press brake, comprising:

a hydraulic cylinder configured to move an upper table and a lower table relative to each other in a vertical direction; and a control unit configured to control a hydraulic circuit of the hydraulic cylinder, wherein the control unit has an abnormality determination threshold value for detecting an abnormality that has actually occurred and a predictor determination threshold value that is a value higher than the abnormality determination threshold value, the hydraulic circuit includes a first pressure control valve configured to control a back pressure of hydraulic oil on a back pressure side port side of the hydraulic cylinder, the control unit is configured to compare a difference in a hydraulic pressure between a hydraulic pressure value of hydraulic oil at an upstream opening of the first pressure control valve and a hydraulic pressure valve of hydraulic oil at a downstream opening of the first pressure control valve with the predictor determination threshold value and the abnormality determination threshold value while the one of the upper table and the lower table, the one moving relative to the other in a vertical direction, stops operation, when the control unit determines that the difference in the hydraulic pressure has fallen below the predictor determination threshold value and is above the abnormality determination threshold value, the control unit is configured to determines a predictor of an occurrence of an abnormality in the hydraulic circuit including the first pressure control valve, and when the control unit determines that the difference in the hydraulic pressure has fallen below the abnormality determination threshold value, the control unit is configured to determine that the abnormality occurs in the hydraulic circuit.

5. The press brake according to claim 4, further comprising a position detector configured to detect position information in a moving direction of either one of the upper table and the lower table, the one moving relative to the other in a vertical direction, wherein the control unit performs composite predictor determination to determine the predictor of the occurrence of the abnormality in the hydraulic circuit, in addition to the predictor determination based on the difference in the hydraulic pressure, by comparing a speed of self-weight movement per unit time calculated based on the position information from the position detector with the predictor determination threshold value that is detected earlier than the abnormality determination threshold value.

6. The press brake according to claim 4, wherein the hydraulic circuit includes a second pressure control valve provided in parallel to the first pressure control valve and configured to control the back pressure of the hydraulic oil on the back pressure side port side of the hydraulic cylinder, and the control unit causes the second pressure control valve to control the back pressure side port side, instead of causing the first pressure control valve to control the back pressure side port side, with respect to the hydraulic circuit, when the abnormality is predicted in the hydraulic circuit as a result of the predictor determination.

* * * * *